Dec. 7, 1926.  1,609,880

A. H. PETERS

SELF LUBRICATED CASTER

Filed March 18, 1925

INVENTOR
Arthur H. Peters
By Charles W. ...

Patented Dec. 7, 1926.

1,609,880

UNITED STATES PATENT OFFICE.

ARTHUR H. PETERS, OF FORT WAYNE, INDIANA, ASSIGNOR TO HORTON MANUFACTURING COMPANY, A CORPORATION OF INDIANA.

SELF-LUBRICATED CASTER.

Application filed March 18, 1925. Serial No. 16,273.

This invention relates to a self-lubricated caster suitable for use on laundry machinery or in other places where damp conditions prevail. Heretofore such casters were usually provided with ball bearings or other plain metallic bearings which would soon rust.

This invention has for one of its objects the manufacture of a caster whose bearings will not become rusty through exposure to dampness.

It has for a further object the manufacture of a caster whose bearing surfaces are formed of wood impregnated with a lubricant so as to render the surfaces self-lubricating.

Other and further important objects of this invention will be apparent from the disclosures in the specification and the accompanying drawing.

The invention (in a preferred form) is illustrated in the drawings and hereinafter more fully described.

Figure 1:
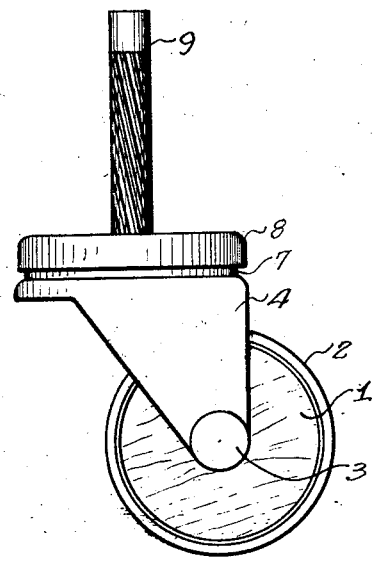
Figure 1 is a side elevational view of the caster of my invention.

In the illustrated embodiment of this invention, I have shown a roller 1 consisting of a wooden cylinder impregnated or saturated with tallow or the like. The cylinder is preferably boiled in tallow or some similar lubricating substance until the pores of the wood are completely filled up. In the present instance, the cylinder is sheathed in a metal cylinder 2. An aperture extends through the center of the wooden cylinder, and a supporting journal 3 extends through said aperture, the ends of said journal being secured to the arms 4 of a bracket or bifurcated device, having a top plate 5 provided with a circular groove 6 in its upper face. A cylindrical wooden block or disk 7 impregnated and saturated with tallow or the like, in a similar way to the roller 1, rests upon the plate 5. The upper surface of the disk 7 has a central depression or recess and a cap plate 8 is stamped to fit the upper contour of the disk 7 and to circumferentially embrace the same by a depending flange. The parts 5, 7 and 8 are centrally apertured for securing the supporting shank 9 of the roller which has a collar 10 fitting in the aforementioned depression, the lower end of the shank being riveted over a bearing washer 11 adjacent the plate 5. The riveting however is of sufficiently loose character to allow a swiveling action of the roller supporting bracket.

Figure 4:
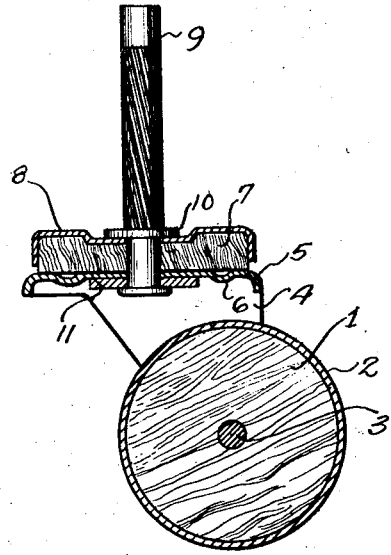
Figure 4 is a longitudinal section of Figure 1, with the shank in elevation.
Figure 3:
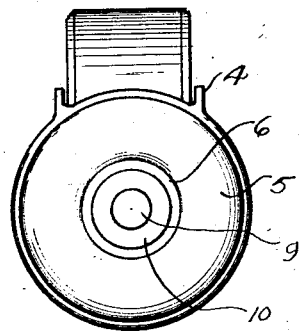
Figure 3 is a top plan view of the caster.
Figure 2:
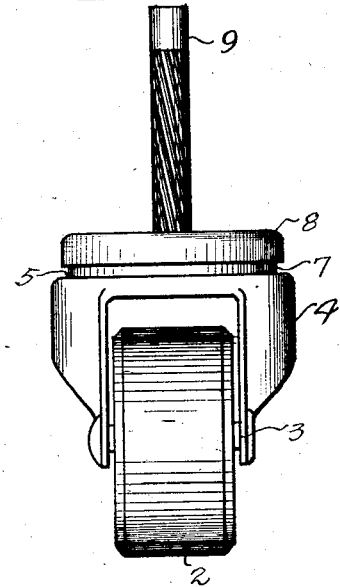
Figure 2 is a front elevational view of the caster.

In referring to Figure 4, it will be noted that the grain of the disk 7 extends between the plates 5 and 8; consequently the tallow or lubricant will tend to seep toward the plate 5 where it may collect in the groove 6. Likewise, the grain of the cylinder 1 is transverse to the journal 3 whereby the lubricant will seep toward the journal and lubricate the same. It will be understood that the roller rotates on the journal 3.

It will be appreciated that the bearing and swiveling parts of the caster are well protected from moisture and that one part of each consists of lubricated wood, whereby rusting thereof is prevented.

I am aware that numerous details of construction may be varied through a wide range without departing from the principles of this invention, and I therefore do not purpose limiting the patent granted otherwise than necessitated by the prior art.

I claim as my invention:

1. A caster comprising a wooden roller, a swivel bracket supporting said roller for rolling movement and having a centrally apertured top plate, a centrally apertured wooden disk impregnated with a lubricating substance forming a swivel bearing for the top plate of said bracket, a centrally apertured cap plate circumferentially enclosing said disk, and a shank extending through said apertures, said shank being secured to said cap plate and wooden disk but journalled in said top plate for swiveling action by said bracket.

2. In a caster, a swivel bracket having a top bearing plate, a roller journaled in said bracket, a shank swiveled in said top plate and a self lubricating bearing disk secured to said shank and forming a thrust bearing for said top bearing plate.

In testimony whereof I have hereunto subscribed my name.

ARTHUR H. PETERS.